US012298010B2

(12) United States Patent
Hamilton et al.

(10) Patent No.: US 12,298,010 B2
(45) Date of Patent: May 13, 2025

(54) PELLET AUGER RELEASE SYSTEM

(71) Applicant: W.C. BRADLEY CO., Columbus, GA (US)

(72) Inventors: Anthony Hamilton, Hamilton, GA (US); Bruce Roberts, Phenix City, AL (US); Donnie Terkalas, Columbus, GA (US); Sleiman Abdallah, Columbus, GA (US); William Dixon, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 462 days.

(21) Appl. No.: 17/482,058

(22) Filed: Sep. 22, 2021

(65) Prior Publication Data
US 2022/0090790 A1 Mar. 24, 2022

Related U.S. Application Data

(60) Provisional application No. 63/081,867, filed on Sep. 22, 2020.

(51) Int. Cl.
*F24B 13/04* (2006.01)
*F24B 5/06* (2006.01)
(52) U.S. Cl.
CPC ............ *F24B 13/04* (2013.01); *F24B 5/06* (2013.01)
(58) Field of Classification Search
CPC ..................................................... E21B 7/201
See application file for complete search history.

(56) References Cited

U.S. PATENT DOCUMENTS

| 2,068,018 | A | 1/1937 | Goetz |
| 2,910,930 | A | 11/1959 | Hankoff |
| 3,017,954 | A | 1/1962 | Kruckewitt |
| 3,606,066 | A | 9/1971 | Anderson |
| 3,623,422 | A | 11/1971 | Marshall |
| 4,300,456 | A | 11/1981 | Messersmith |
| 4,593,629 | A | 6/1986 | Pedersen et al. |
| 4,779,544 | A | 10/1988 | Stevens |
| 4,810,510 | A | 3/1989 | Lever et al. |

(Continued)

FOREIGN PATENT DOCUMENTS

| AT | 402850 B | 9/1997 |
| CH | 688303 A5 | 7/1997 |

(Continued)

OTHER PUBLICATIONS

Rider 900 Pellet Grill—Product Walkthrough, first available Feb. 19, 2020, YouTube, [online], [site visited Jan. 24, 2022], Available from internet URL: https://www.youtube.com/watch?v=3gBOTUUe22k (Year: 2020).

(Continued)

*Primary Examiner* — Jason Lau
(74) *Attorney, Agent, or Firm* — GableGotwals; David G. Woodral

(57) ABSTRACT

A system has a drive mechanism affixed to an auger to selectively impart rotational forces to the auger for movement of pellet fuel for a cooking grill, and a lever arm affixed in a pivoting relationship to the drive mechanism and to a fixed location separate from the drive mechanism such that manipulation of the lever arm results in longitudinal movement of the auger.

12 Claims, 16 Drawing Sheets

(56) References Cited

U.S. PATENT DOCUMENTS

| | | |
|---|---|---|
| 4,823,684 A | 4/1989 | Traeger et al. |
| 4,856,438 A | 8/1989 | Peugh |
| 4,909,235 A | 3/1990 | Boetcker |
| 4,966,126 A | 10/1990 | Wu |
| 5,122,038 A * | 6/1992 | Malkoski ............... F04D 7/00 417/313 |
| 5,197,379 A | 3/1993 | Leonard, Jr. |
| 5,251,607 A | 10/1993 | Traeger et al. |
| 5,375,540 A | 12/1994 | Verrecchia et al. |
| 5,423,430 A | 6/1995 | Zaffiro et al. |
| 5,429,110 A | 7/1995 | Burke et al. |
| 5,490,452 A | 2/1996 | Schlosser et al. |
| 5,809,991 A | 9/1998 | Pai |
| 5,941,234 A | 8/1999 | Norburn et al. |
| 6,039,039 A | 3/2000 | Pina, Jr. |
| 6,187,359 B1 | 2/2001 | Zuccarini |
| 6,209,533 B1 | 4/2001 | Ganard |
| 6,223,737 B1 | 5/2001 | Buckner |
| 6,293,271 B1 | 9/2001 | Barbour |
| 6,314,955 B1 | 11/2001 | Boetcker |
| 6,336,449 B1 | 1/2002 | Drisdelle et al. |
| 7,360,639 B2 | 4/2008 | Sprouse et al. |
| 7,530,351 B2 | 5/2009 | Leverty |
| 7,624,675 B2 | 12/2009 | Galdamez |
| D623,013 S | 9/2010 | Alden et al. |
| 7,900,553 B1 | 3/2011 | Maurin |
| 7,984,709 B1 | 7/2011 | Byrnes et al. |
| 8,006,686 B2 | 8/2011 | Hunt et al. |
| 8,267,078 B2 | 9/2012 | Kuntz |
| D681,394 S | 5/2013 | Parel et al. |
| 8,651,018 B1 | 2/2014 | Loud, III |
| 8,899,145 B2 | 12/2014 | Harrison et al. |
| 8,985,092 B2 | 3/2015 | Ahmed |
| D760,539 S | 7/2016 | Colston |
| 9,427,108 B2 | 8/2016 | Ahmed |
| 9,441,838 B2 | 9/2016 | Baker |
| 9,585,518 B1 | 3/2017 | Phillips |
| 9,635,978 B2 | 5/2017 | Measom et al. |
| 9,759,429 B2 | 9/2017 | Tucker |
| 9,814,354 B2 | 11/2017 | McAdams et al. |
| 9,913,559 B2 | 3/2018 | Polter et al. |
| D817,091 S | 5/2018 | Colston |
| 10,077,904 B2 | 9/2018 | Grant |
| 10,201,247 B1 | 2/2019 | Jones |
| 10,292,531 B1 | 5/2019 | Hancock et al. |
| 10,495,317 B1 | 12/2019 | Hancock et al. |
| D871,821 S | 1/2020 | Boltz et al. |
| D901,244 S | 11/2020 | Baker et al. |
| D907,424 S | 1/2021 | Measom et al. |
| D915,138 S | 4/2021 | Bennion et al. |
| D921,413 S | 6/2021 | Fitzpatrick |
| D927,917 S | 8/2021 | Yueh |
| D935,840 S | 11/2021 | Carter et al. |
| 11,166,590 B2 | 11/2021 | Zheng |
| 11,181,276 B2 | 11/2021 | Colston et al. |
| 11,181,277 B2 | 11/2021 | Donnelly et al. |
| 11,206,948 B2 | 12/2021 | Measom et al. |
| 11,231,178 B2 | 1/2022 | James |
| D945,208 S | 3/2022 | Duan et al. |
| 11,359,817 B2 | 6/2022 | Donnelly et al. |
| 2001/0017131 A1 | 8/2001 | Sim |
| 2004/0226550 A1 | 11/2004 | Hutton et al. |
| 2004/0255926 A1 | 12/2004 | Waits et al. |
| 2005/0126556 A1 | 6/2005 | Bossler |
| 2008/0085172 A1 | 4/2008 | Harman et al. |
| 2008/0098906 A1 | 5/2008 | Davis |
| 2008/0230044 A1 | 9/2008 | Warner |
| 2009/0013985 A1 | 1/2009 | Little et al. |
| 2009/0056695 A1 | 3/2009 | Cosgrove |
| 2009/0293860 A1 | 12/2009 | Carlson |
| 2010/0218754 A1 | 9/2010 | Kuntz |
| 2011/0073101 A1 | 3/2011 | Lau et al. |
| 2011/0136066 A1 | 6/2011 | Geselle et al. |
| 2011/0275023 A1 | 11/2011 | Knight |
| 2013/0160757 A1 | 6/2013 | Atemboski et al. |
| 2013/0298894 A1 | 11/2013 | Kleinsasser |
| 2013/0327259 A1 | 12/2013 | Freeman |
| 2014/0261005 A1 | 9/2014 | Karau |
| 2014/0326232 A1 | 11/2014 | Traeger |
| 2014/0326233 A1 | 11/2014 | Traeger |
| 2014/0373827 A1 | 12/2014 | Zhu et al. |
| 2014/0377431 A1 | 12/2014 | Kazerouni |
| 2015/0079250 A1 | 3/2015 | Ahmed |
| 2015/0081086 A1 | 3/2015 | Hallowell et al. |
| 2015/0136109 A1 | 5/2015 | Baker |
| 2015/0182074 A1 | 7/2015 | Bucher et al. |
| 2015/0265099 A1 | 9/2015 | Coffie |
| 2015/0320259 A1 | 11/2015 | Tucker |
| 2016/0174767 A1 | 6/2016 | Schlosser et al. |
| 2016/0245529 A1 | 8/2016 | McClean |
| 2016/0255999 A1 | 9/2016 | McAdams et al. |
| 2016/0327263 A1 | 11/2016 | Traeger |
| 2016/0341423 A1 | 11/2016 | Johnson |
| 2016/0353706 A1 | 12/2016 | Gallagher et al. |
| 2017/0065124 A1 | 3/2017 | Colston |
| 2017/0067649 A1 | 3/2017 | Colston |
| 2017/0102149 A1 | 4/2017 | Nadal |
| 2017/0164783 A1 | 6/2017 | Sauerwein et al. |
| 2017/0196400 A1 | 7/2017 | Colston |
| 2017/0198917 A1 | 7/2017 | Gillespie et al. |
| 2017/0219213 A1 | 8/2017 | Measom et al. |
| 2017/0289257 A1 | 10/2017 | Colston |
| 2017/0343218 A1 | 11/2017 | Tucker |
| 2017/0370592 A1 | 12/2017 | Bogazzi |
| 2018/0028018 A1 | 2/2018 | Barnett et al. |
| 2018/0031246 A1 | 2/2018 | Barford |
| 2018/0168397 A1 | 6/2018 | Colston |
| 2018/0192822 A1 | 7/2018 | Cedar et al. |
| 2018/0213970 A1 | 8/2018 | Colston |
| 2018/0296031 A1 | 10/2018 | Terrell, Jr. et al. |
| 2018/0317707 A1 | 11/2018 | Dahle |
| 2018/0368617 A1 | 12/2018 | Allmendinger |
| 2018/0368618 A1 | 12/2018 | Measom et al. |
| 2019/0008321 A1 | 1/2019 | Allmendinger |
| 2019/0282032 A1 | 9/2019 | Colston et al. |
| 2019/0290064 A1 | 9/2019 | Colston et al. |
| 2019/0290066 A1 | 9/2019 | Colston |
| 2019/0293295 A1 | 9/2019 | Colston et al. |
| 2019/0335774 A1 | 11/2019 | Garces et al. |
| 2019/0365152 A1 | 12/2019 | Dahle et al. |
| 2019/0374065 A1 | 12/2019 | Hancock et al. |
| 2019/0387924 A1 | 12/2019 | Zheng |
| 2020/0086780 A1 | 3/2020 | Baker et al. |
| 2020/0116349 A1 | 4/2020 | Rahmani et al. |
| 2020/0158337 A1 | 5/2020 | Baker et al. |
| 2020/0214304 A1 | 7/2020 | Garces et al. |
| 2020/0214501 A1 | 7/2020 | Gafford et al. |
| 2020/0221717 A1 | 7/2020 | Jackson |
| 2020/0237148 A1 | 7/2020 | Donnelly |
| 2020/0333011 A1 | 10/2020 | Ahmed et al. |
| 2020/0370752 A1 | 11/2020 | Ahmed et al. |
| 2021/0267413 A1 | 9/2021 | Roberts et al. |
| 2021/0298333 A1 | 9/2021 | Strong et al. |
| 2021/0341144 A1 | 11/2021 | Parsons et al. |
| 2021/0356130 A1 | 11/2021 | Li |
| 2021/0361115 A1 | 11/2021 | Colston et al. |
| 2022/0046937 A1 | 2/2022 | Simon et al. |
| 2022/0082262 A1 | 3/2022 | Colston et al. |

FOREIGN PATENT DOCUMENTS

| | | |
|---|---|---|
| CN | 201515960 U | 6/2010 |
| CN | 102345861 A | 2/2012 |
| CN | 203549790 U | 4/2014 |
| CN | 105263378 | 1/2016 |
| CN | 103989414 B | 5/2016 |
| DE | 102009014010 A1 | 10/2010 |
| DE | 4020171009570011 S | 6/2018 |
| FR | 713315 A | 10/1931 |
| KR | 100752761 B1 | 8/2007 |
| KR | 100821465 B1 | 4/2008 |
| KR | 20090119121 A | 11/2009 |
| WO | 2013116946 A1 | 8/2013 |
| WO | 2017044598 A1 | 3/2017 |

(56) References Cited

FOREIGN PATENT DOCUMENTS

| WO | 2017064528 A1 | 4/2017 |
| WO | WO2018111155 | 6/2018 |
| WO | 2018125681 A1 | 7/2018 |
| WO | 2018208919 A1 | 11/2018 |
| WO | PCT/US2020/020487 | 5/2020 |
| WO | PCT/US2020/035535 | 10/2020 |
| WO | PCT/US2021/020303 | 5/2021 |
| WO | PCT/US2021/51537 | 1/2022 |

OTHER PUBLICATIONS

Char-Broil_W.C. Bradley Co, W.C. Bradley, [online], [site visited Jan. 24, 2022], Available from internet URL: https://www.wcbradley.com/divisions/char-broil (Year: 2022).

Rider 900 Pellet Grill, Oklahoma Joes, [online], [site visited Jan. 24, 2022], Available from internet URL: https://www.oklahomajoes.com/rider-900-pellet-grill (Year: 2022).

Kornrumpf et al, "Electric Stoves, Calrods and Cooking with Electricity", Mar. 16, 2015, pp. 2, Publisher: Edicson Tech Center; 2015.

\* cited by examiner

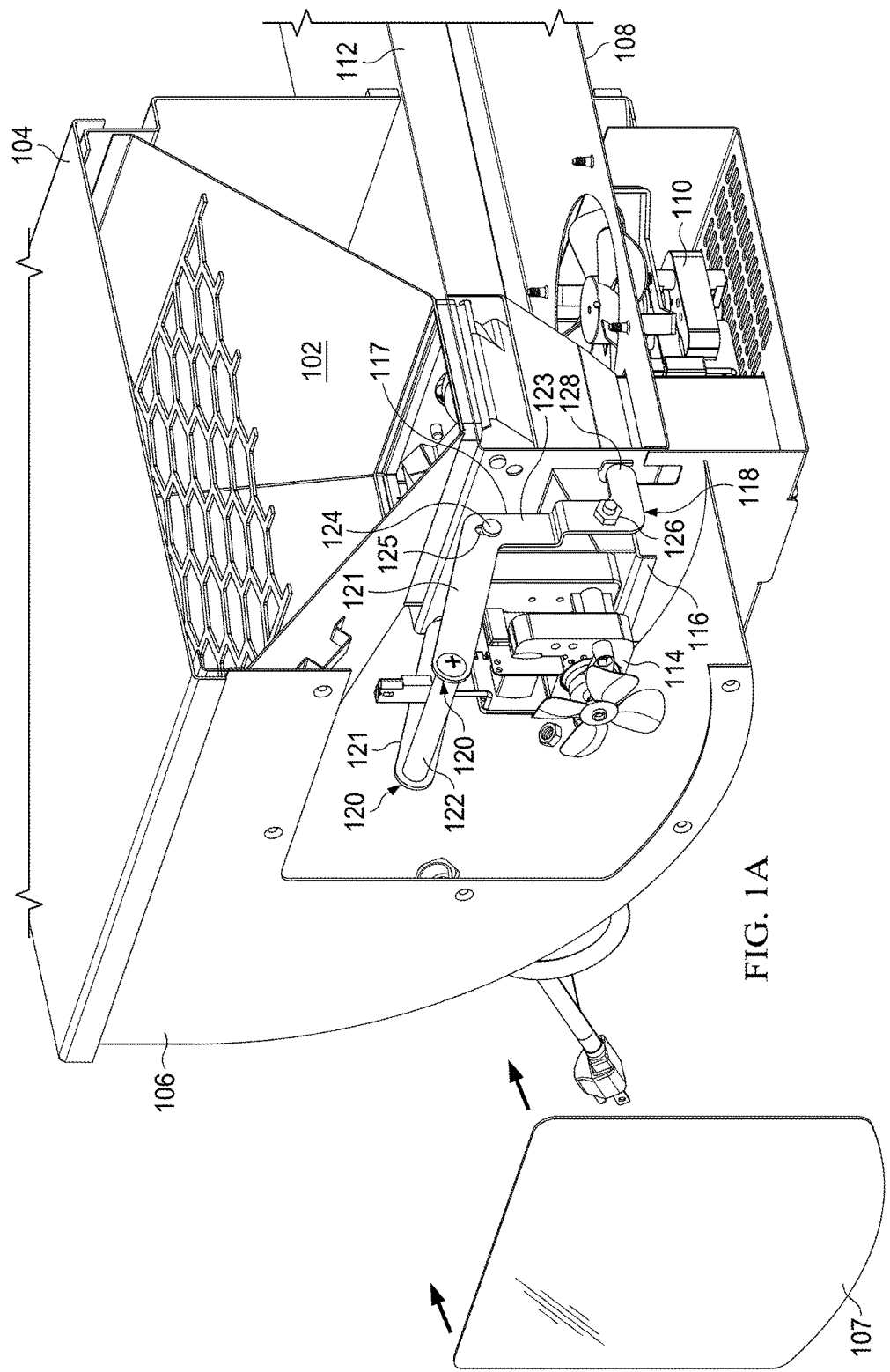

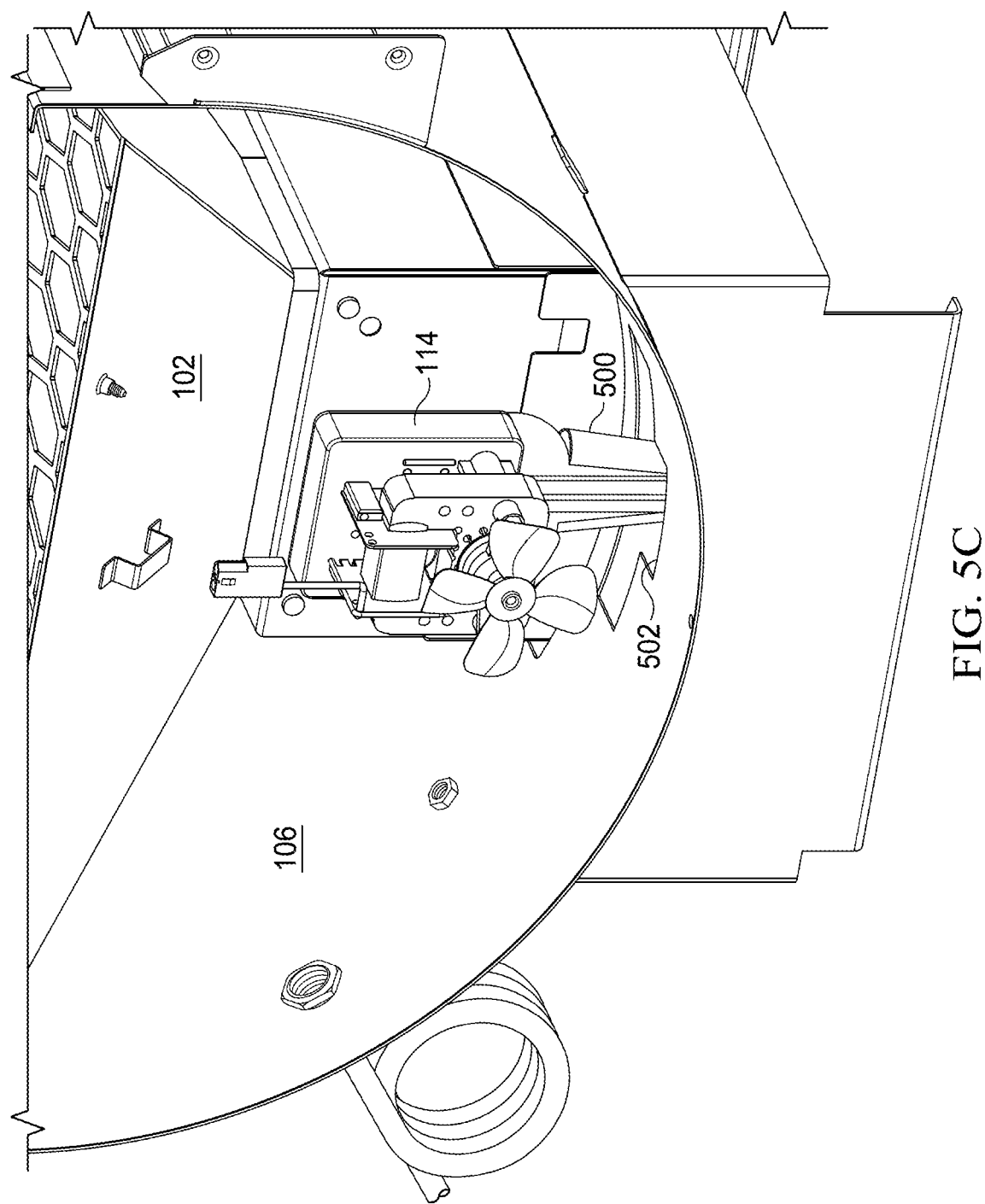

PELLET AUGER RELEASE SYSTEM

CROSS-REFERENCE TO RELATED CASES

This application claims the benefit of U.S. provisional patent application Ser. No. 63/081,867, filed on Sep. 22, 2020, and incorporates such provisional application by reference into this disclosure as if fully set out at this point.

FIELD OF THE INVENTION

This disclosure relates to pellet fueled cooking grills in general and, more particularly, to pellet feeding mechanisms for such grills.

BACKGROUND OF THE INVENTION

Outdoor wood pellet fired cooking and smoking appliances are known in the art. U.S. Pat. Nos. 4,823,684 and 5,251,607 to Joseph Traeger, et al. provide examples of such technology. Over the years there have been many improvements and variations of these products made but their essential principal of operation remains the same. Current pellet grills have a helical auger powered by an electric motor to move wood pellets from a hopper bin to a firepot, at a controlled rate, for combustion and heat generation.

Occasionally, the pellets in the auger tube will be compacted and/or expand to the point where the electric motor can no longer turn the helical auger. These and other causes can result in a pellet jam. Without fuel delivery, combustion and heat can no longer be maintained or generated.

What is needed is a system and method for addressing these and related issues.

SUMMARY OF THE INVENTION

The invention of the present disclosure, in one aspect thereof, comprises a system having a drive mechanism affixed to an auger to selectively impart rotational forces to the auger for movement of pellet fuel for a cooking grill, and a lever arm affixed in a pivoting relationship to the drive mechanism and to a fixed location separate from the drive mechanism such that manipulation of the lever arm results in longitudinal movement of the auger.

In some embodiments, the system further includes a handle affixed to the lever arm above a level of the auger. The lever arm may further comprise an upper transverse segment affixed to a handle on a first end and to a substantially upright segment on a second end, the substantially upright segment affixed to the drive mechanism on an upper portion thereof and affixed to the fixed location on a lower portion thereof. The system may comprise a bracket interposing the drive mechanism and the substantially upright segment and having a pivot axle fitted into an oblong opening in the substantially upright segment.

In some cases, a bracket is affixed to an air intake plenum as the fixed location separate from the drive mechanism and connected to the lower portion of the substantially upright segment. The system may include a boss extending from the lower portion of the substantially upright segment to limit rotation of the lever arm with respect to the bracket affixed to the air intake plenum by contacting the air intake plenum.

In other embodiments, the system has a handle affixed to the lever arm below a level of the auger. The lever arm may further comprise a lower transverse segment extending to a handle and a middle segment extending upward to an upper segment. The upper segment may be rotationally connected to the drive mechanism on an upper portion thereof, and may be rotationally connected to a bracket on an air plenum as the fixed location separate from the drive mechanism.

Some embodiments further comprise a bracket interposing the drive mechanism and the upper portion of the upper segment and connecting to the upper segment by an axle fitted into an oblong opening in the upper segment. A boss may extend from the middle segment to limit rotation of the lever arm with respect to the fixed location by contacting the air plenum.

In some cases the system includes an auger tube in which the auger rotates and through which the pellet fuel travels, the auger tube having a fixed relationship with respect to the fixed location separate from the drive mechanism such that longitudinal movement of the auger results in longitudinal movement of the auger within the auger tube. The fixed location separate from the drive mechanism may comprise an air plenum through which the auger tube and auger travel to a fire pot provided combustion air from the plenum.

The invention of the present disclosure, in another aspect thereof, comprise a a system with a drive mechanism affixed to an auger to selectively impart rotational forces to the auger for movement of pellet fuel for a cooking grill, a bracket affixed to the cooking grill, and a threaded stud affixed to the bracket and to the drive mechanism such that rotation of the stud results in longitudinal movement of the auger.

In some embodiments, the threaded stud is fitted to a cross bar connecting to a pair of spaced apart arms that span from the cross bar to a bracket affixed to the drive mechanism. The bracket may affix to a cabinet containing a pellet hopper feeding the auger the pellet fuel.

The invention of the present disclosure, in another aspect thereof, comprise a system having a drive mechanism affixed to an auger via an output shaft to selectively impart rotational forces to the auger for movement of pellet fuel for a cooking grill. The output shaft is exposed between the drive mechanism an auger and has a shape configured to be selectively engaged by a tool for manual rotation of the auger.

In some cases, the drive mechanism is housed within a cabinet having an opening defined in a lower portion thereof for insertion of the tool for manual rotation of the auger The invention of the present disclosure, in another aspect thereof, comprise a system having a drive mechanism affixed to an auger via an output shaft to selectively impart rotational forces to the auger for movement of pellet fuel for a cooking grill, and a lever handle affixed to the drive mechanism and extended into a slot defined in a cabinet containing the drive mechanism. The lever handle contacting the slot limits rotation of the drive mechanism inside the cabinet, and manipulation of the lever handle in the slot imparts rotational movement to the auger.

BRIEF DESCRIPTION OF THE DRAWINGS

FIG. 1A is a perspective cutaway view of a jam clearing device according to aspects of the present disclosure.

FIG. 5C is another perspective cutaway view of the jam clearing system of FIG. 5A.

DETAILED DESCRIPTION OF THE PREFERRED EMBODIMENTS

Figure 6:
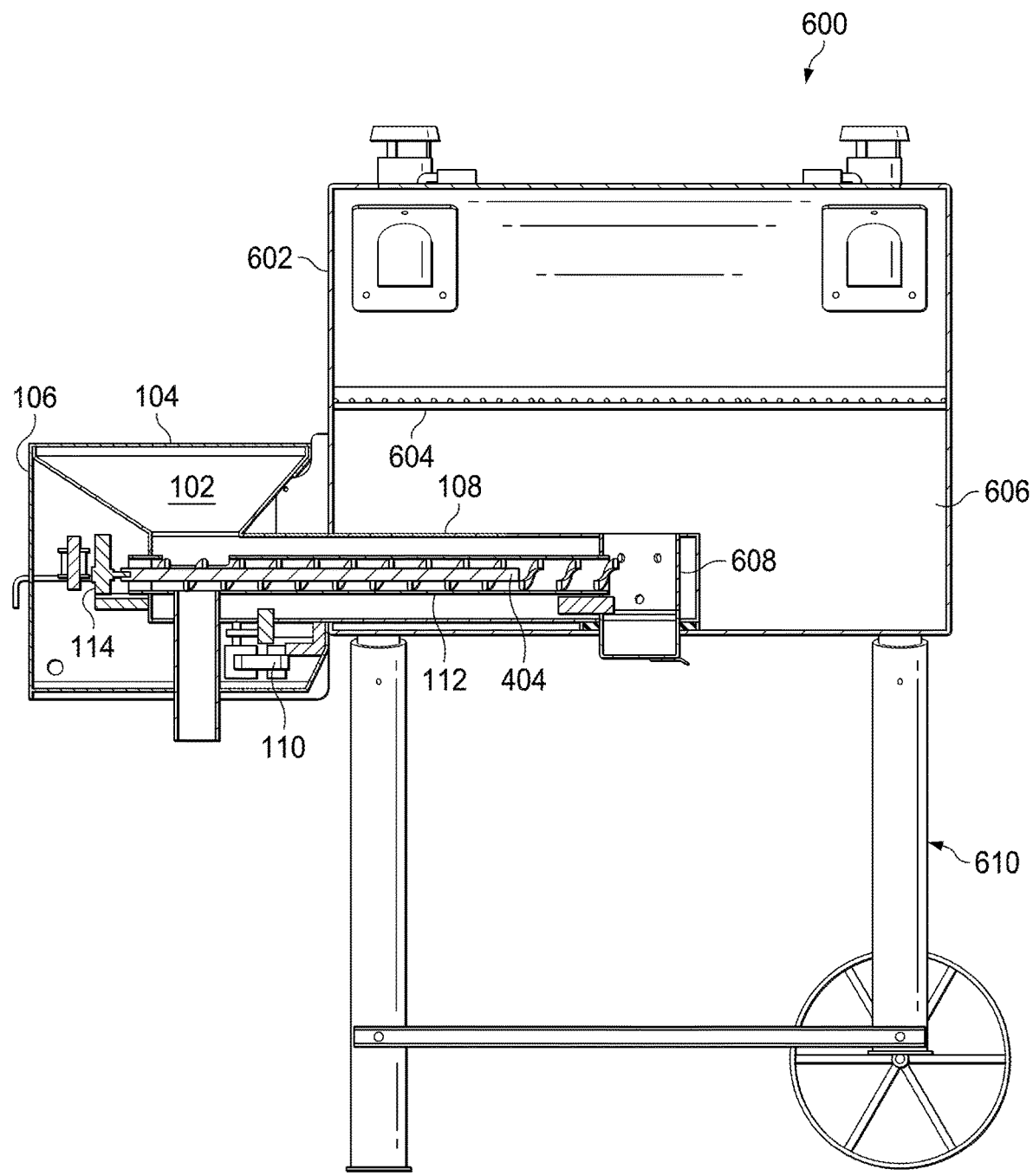
FIG. 6 is a cutaway view of a pellet grill/smoker system prior to or without installation of the jam clearing devices of the present disclosure.

Shown for reference in FIG. 6 is a cutaway view of a pellet grill/smoker system 600 prior to or without installation of certain features of the present disclosure. A pellet grill/smoker 600 system may comprise a cooking chamber 602 having a cooking grate 604 over a fire box 606. The firebox 606 may contain a pellet fuel combustion chamber or fire pot 608 that provides heat and/or smoke for cooking. Pelletized fuel may be selectively delivered to the fire pot 608 for combustion by an auger 404 rotating within an auger tube 112. Combustion air may also be delivered under positive pressure via plenum 108.

A cabinet 106, which may be external to the cooking chamber 602 and/or fire box 606, may contain a hopper 102 with an openable lid 104 that supplies pelletized fuel to the auger 404 for delivery to the fire pot 608. A drive mechanism 114, which may be based on an electric motor and gear box, provides motive or rotational power to the auger 404. The auger tube 112 and auger 404 may pass from the hopper 102 in the cabinet 106 to the fire pot 608 in the fire box 606.

Air may be forced into the plenum 108 for delivery to the fire pot 608 by an electrically powered fan 110. The plenum 108 may span or provide an air conduit between the cabinet (or other fan location) to the fire pot 608. The auger tube 112 may be contained partially within the plenum 108. Various controls as are known in the art may be used to selectively activate the drive mechanism 114 and/or fan 110 for suitable operations of the grill/smoker 600.

Consumers that experience a pellet jam with a device configured similarly to the grill/smoker 600 have very few options to restore their pellet grill/smoker's functionality. One solution is to disassembly device—removing the auger drive mechanism 114 and helical auger 404 from the auger tube 112. Then consumers must dig out or clean out the old wood pellets or debris manually from the auger tube 112. After cleaning the debris from the auger tube 112, they must reassemble the helical auger 404 and drive mechanism 114 and any/all secondary parts or panels that were removed. This can be very time consuming and consumers risk damaging or losing components that are removed.

However, according to embodiments of the present disclosure, a consumer that experiences a pellet jam as noted above may quickly apply manually generated and mechanically transmitted forces or power to un-jam the pellets in the auger tube 112.

Figure 1B:
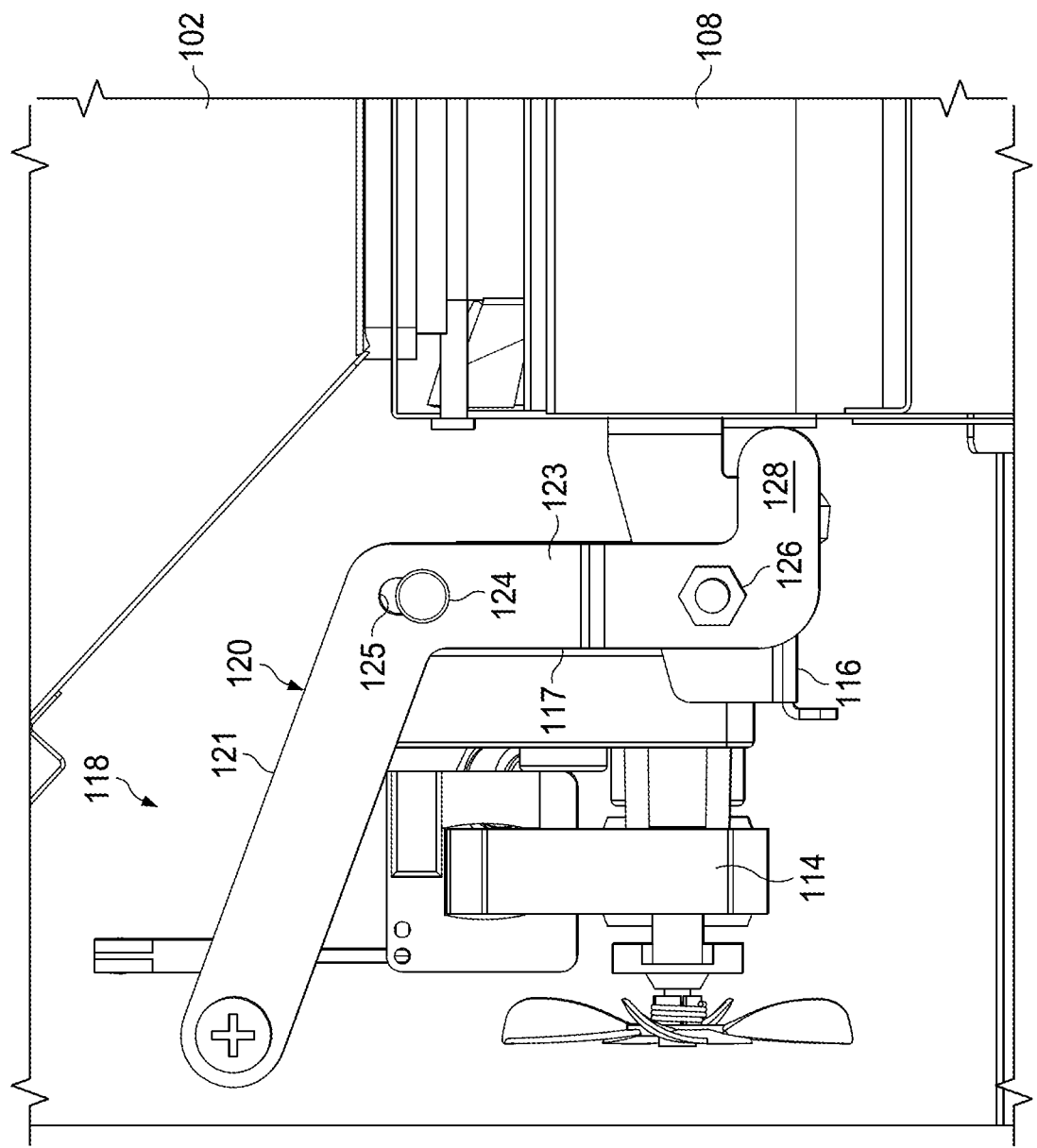
FIG. 1B is a side view of the device of FIG. 1A.
Figure 1C:
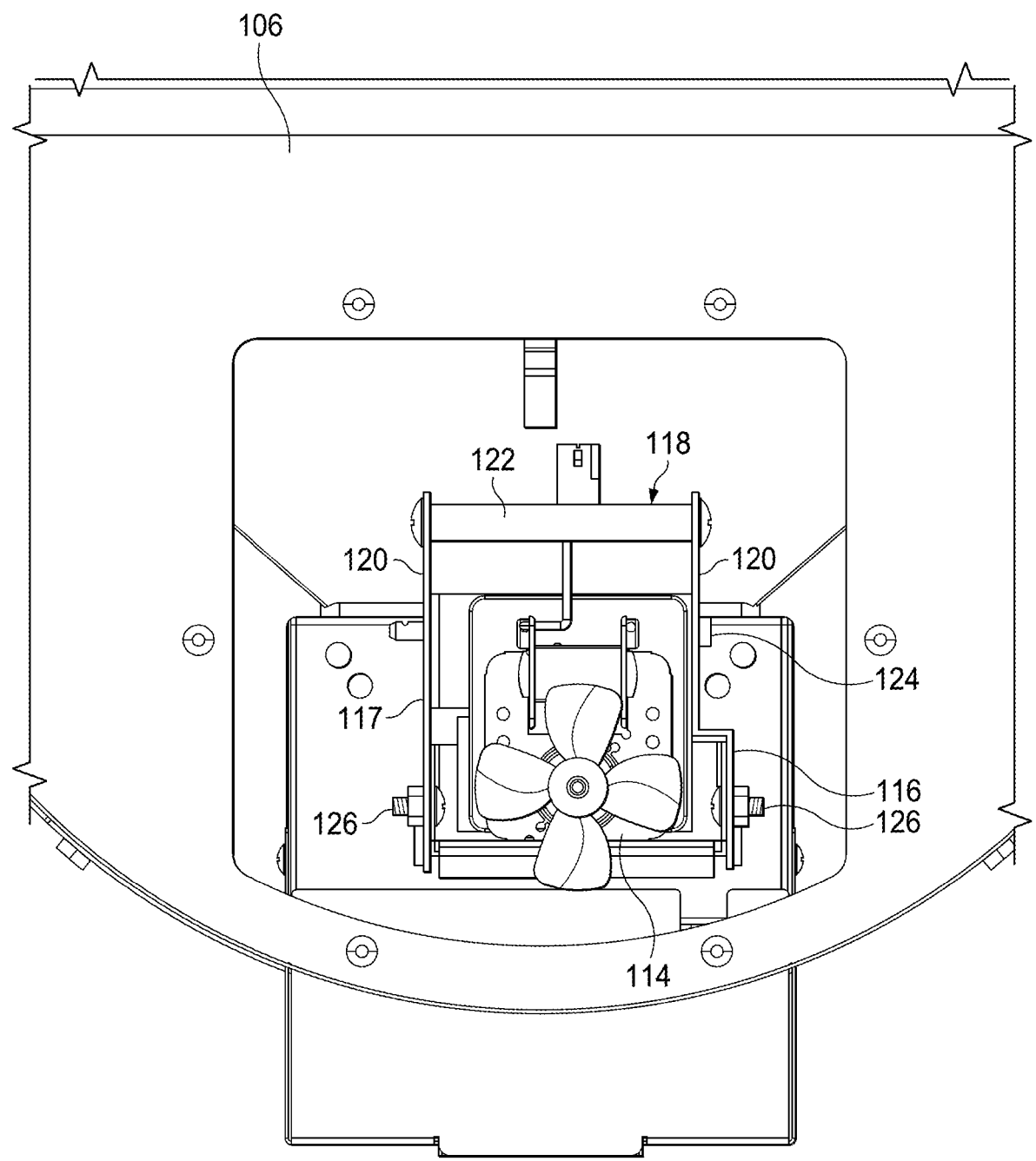
FIG. 1C is an end view of the device of FIG. 1A.

Referring now to FIG. 1A a perspective cutaway view of a jam clearing device 118 according to aspects of the present disclosure is shown. FIG. 1B is a side view of the device of FIG. 1A; and FIG. 1C is an end view of the device of FIG. 1A. It should be understood that the device 118 may be suitable for use with a pellet smoker/grill system 600 as shown in FIG. 6, but that it may also be adapted to pellet smokers or grills having different configurations including, but not limited to, those with different cabinet, fire box, cooking chamber, auger, and/or plenum arrangements.

For purposes of illustration, hopper 102 is shown with lid 104 situated in a cabinet 106. The cabinet 106 may be adjacent to or form a portion of the cooking chamber 602 or fire box 606. Fuel pellets may be placed into the hopper 102, from where they are selectively augured into the firepot 608 in the fire box 606 and/or below the cooking chamber 602.

According to various embodiments, a jam clearing device 118 may be built into the grill system (e.g., the smoker/grill 600 or similar). The device 118 may comprise a handle 122 within the cabinet 106, possibly hidden behind a removable or openable access panel 107. The handle 122 is affixed to one or more lever arms 120, which are, in turn, affixed to the drive mechanism 114 and/or the auger 404 via a bracket 117. The lever arms 120 may comprise a series of connected segments (though they may be manufactured as one piece). A lateral extension 121 may extend between the handle 122 and an upright segment 123. The lateral extension 121 may have an upward angle toward the handle 122 to provide clearance over the drive mechanism 114 and/or for the convenience and ease of reach of the user. An upright segment 123 may provide a boss 128 extending therefrom at an opposite end in a longitudinal direction of the auger tube 112, or somewhat in an opposite direction from the later extension 121. In addition, the upright segment 123 is not necessarily completely upright so long as is provides the functionality described herein.

A lower bracket 116 is affixed to the plenum 108, auger tube 112, and/or another location in or on the cabinet 106, the firebox 606, or the cooking chamber 602. As illustrated, the bracket 118 affixes to the air plenum 108. The lever arms 120 affix to the bracket 117 via pivot axle 124 or stud at or near an upper portion of the upright segment 123. The pivot axle 124 may be received in the lever arm 120 in an oblong hole or opening 124 which may have a height grater than a width. The lever arms 120 may affix to the bracket 116 via bolts 126 on or near a lower portion of the upright segment 123. The lever arms 120 may be at least somewhat rotatable with respect to the pin 124 and/or bolts 126. This arrangement, along with the oblong opening 125 allows for manual elevation of the handle 120 to provide for longitudinal displacement of the auger 404 within the tube 112 such that jams of pellets in the tube 112 are cleared. The bosses 128 on lever arms 120 limit the degree to which the drive mechanism 114, and/or internal auger 404 may be moved or withdrawn from the plenum 108 and/or auger tube 112 by limiting rotation of the upright segment 123 with respect to the bolt 126.

To operate the jam clearing device 118, the handle 122 may be lifted repeatedly by the user. Weight of the drive mechanism 114, auger tube 112, and or auger 404 may return the mechanism to the resting position as illustrated, possibly with a mild impact between the bosses 128 and the plenum 108. This motion is translated into longitudinal displacement or mild jarring of the auger 404 as described above, which will tend to clear any jams within the auger tube. It should be understood though that jarring is not necessary in all case. Sometimes simply providing movement of the auger 404 will free any stuck fuel pellets or debris allowing them to be expelled by the auger 404 or otherwise.

Figure 2A:
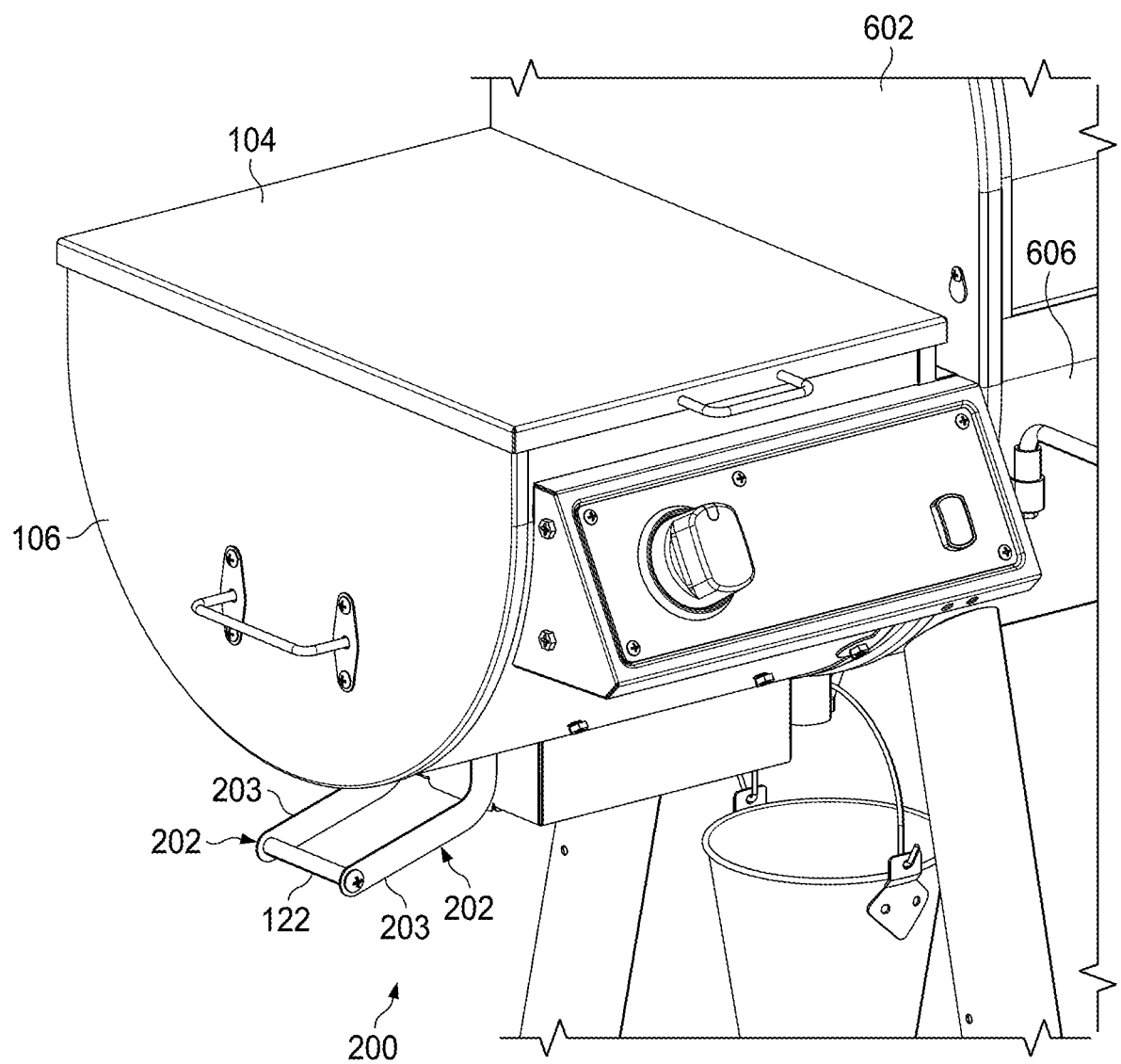
FIG. 2A is a perspective view of another jam clearing device according to aspects of the present disclosure.
Figure 2B:
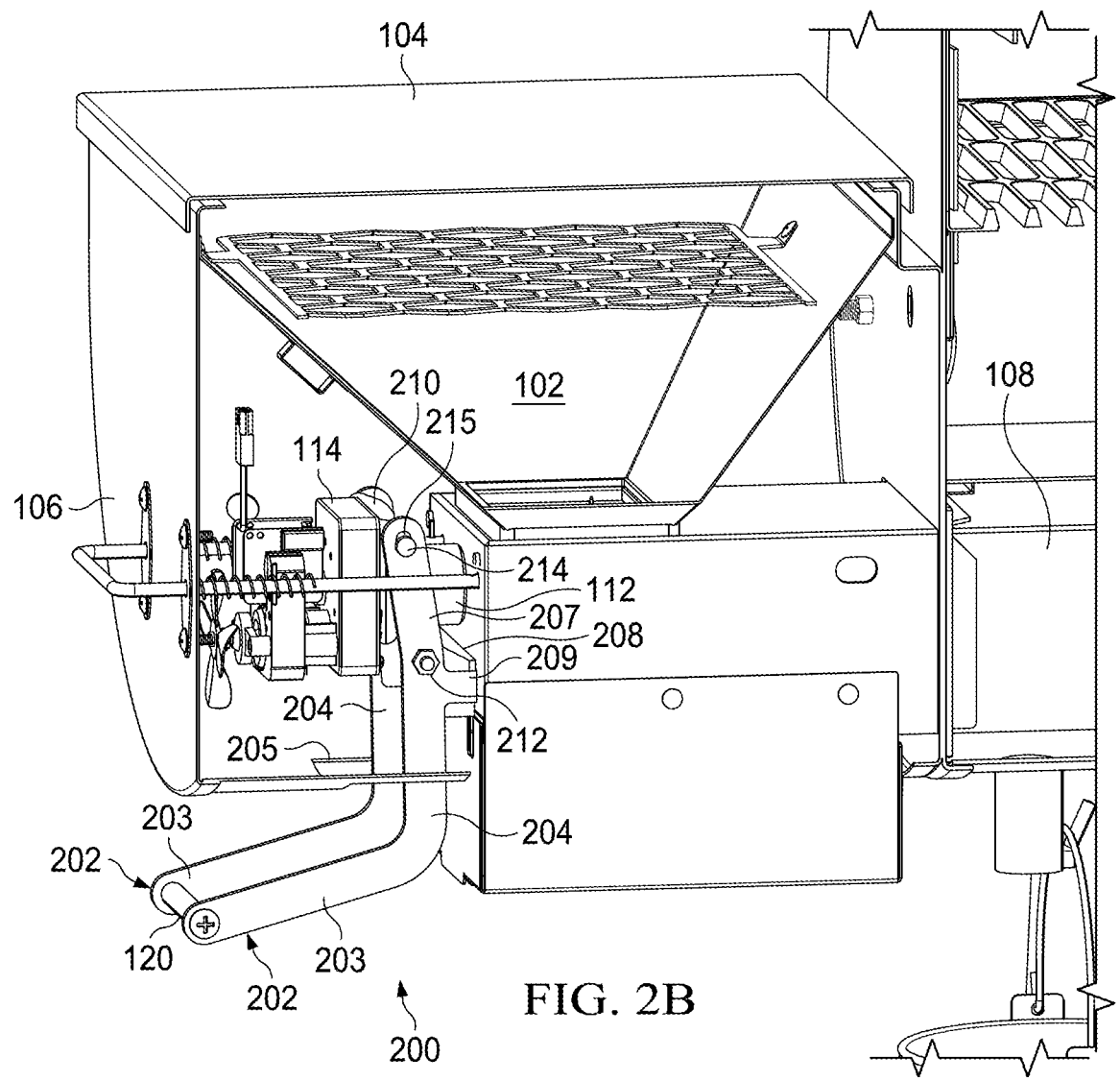
FIG. 2B is a perspective cutaway view of the device of FIG. 2A.
Figure 2C:
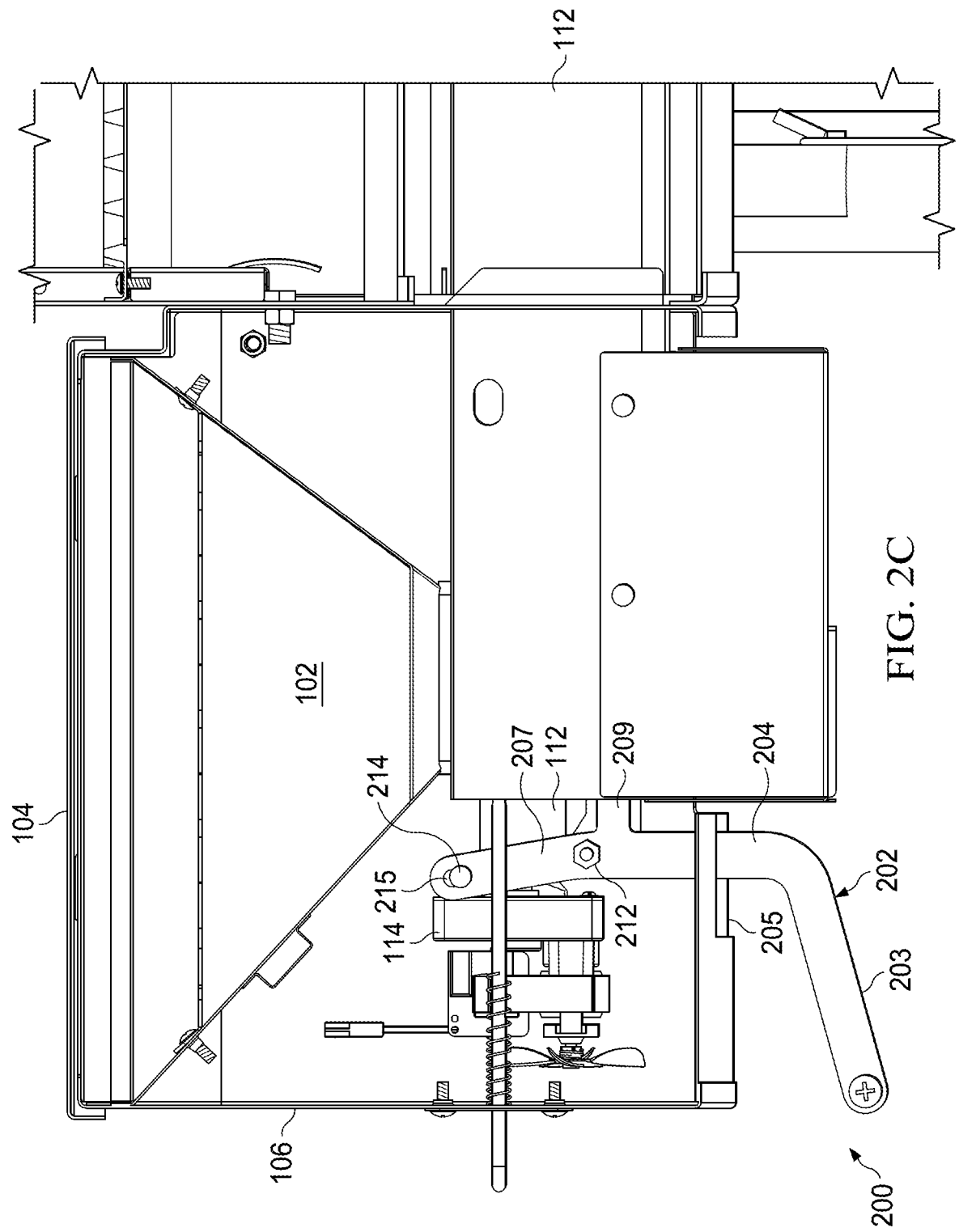
FIG. 2C is a side view of the device of FIG. 2A.

Referring now to FIG. 2A a perspective view of another jam clearing device 200 according to aspects of the present disclosure is shown. FIG. 2B is a perspective cutaway view of the device of FIG. 2A; and FIG. 2C is a side view of the device of FIG. 2A. This embodiment uses a handle 120 with similar function to that described above, but with the handle 120 extended outside the pellet smoker body (e.g., cabinet 106) to be accessed without removing any panels.

The handle 122 connects to one or more lever arms 202 extending outside the cabinet 106. The lever arms 202 may extend through a lower opening 205 in the cabinet 106. Lever arms 202 may comprise multiple segments, though these may be integrally formed as a single component. A lower lateral segment 203 extends to the handle 122. The lateral segment 203 may extend downwardly somewhat toward the handle 122 to allow clearance for lifting of the handle 122 toward the cabinet 106. A middle segment 204 may extend generally upwardly toward the auger tube 112 and connect the lateral segment 203 to an upper segment 207.

The upper segment 207 may connect on a lower portion thereof to a bracket 208 affixed to the plenum 108 or another stationary location within the housing 106. A bolt or other fastener 212 may allow for some rotational movement between the upper segment and the bracket 208. The upper segment 207 may be connected on an upper portion thereof to a bracket 210 that is affixed to the drive mechanism 114 and/or the auger 404. The upper segment 207 may be connected to the bracket 210 via a stud 214 fitted into an opening 215 that is oblong with a greater height than width.

Upward movement of the handle 122 results in longitudinal movement of the drive mechanism 114 and/or auger 404 to aid in clearing or dislodging jams. Bosses 209 extending from the middle segments 204 toward the plenum 108 may ensure that the drive mechanism 214 and auger return to a suitable location when the handle 120 is released or is pushed back down to its original position. Contact between the upper segments 207 and the plenum box 108 may limit the degree to which the auger 404 may be pushed through the auger tube 112.

Figure 3A:
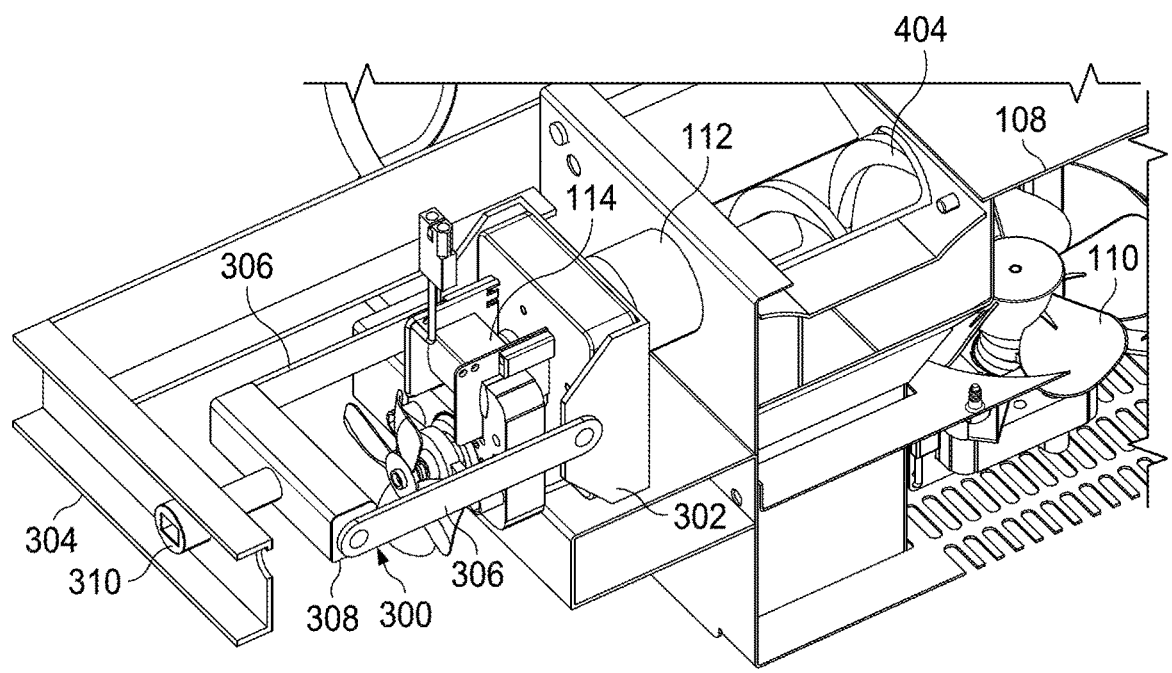
FIG. 3A is a perspective cutaway view of another jam clearing device according to aspects of the present disclosure.
Figure 3B:
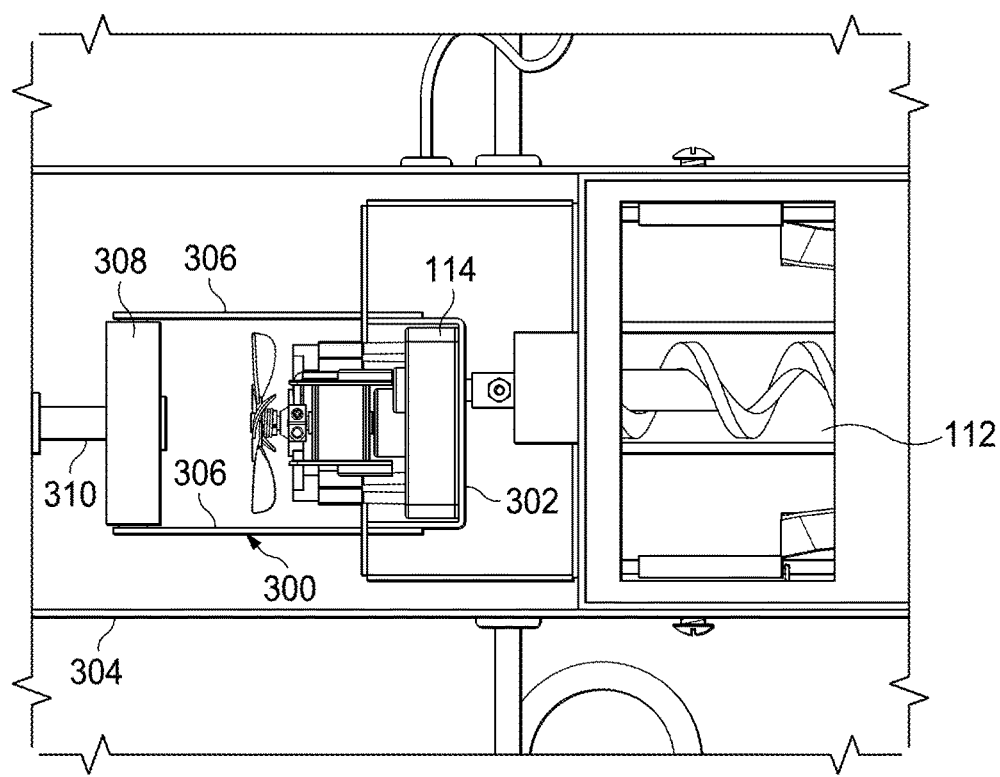
FIG. 3B is an overhead view of the device of FIG. 3A.
Figure 3C:
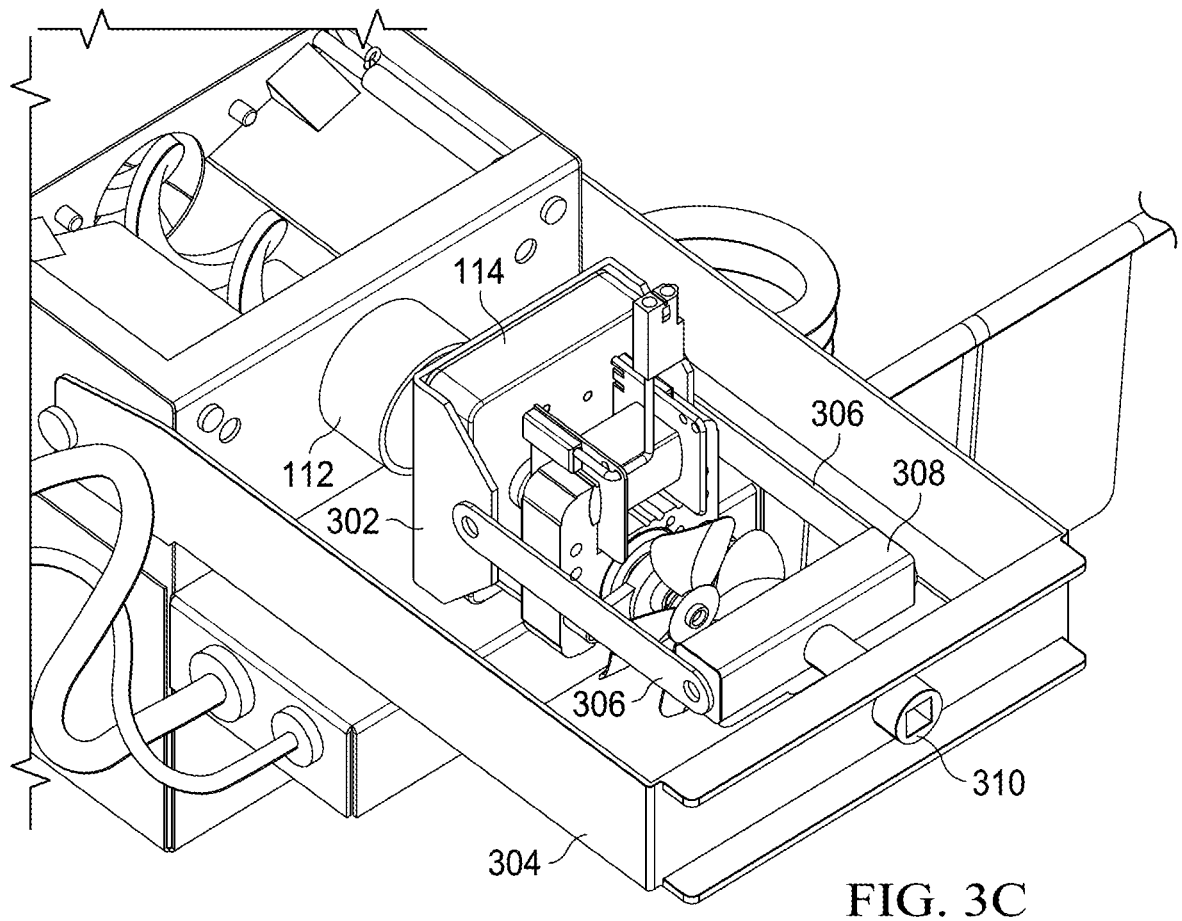
FIG. 3C is a perspective view of the device of FIG. 3A.
Figure 3D:
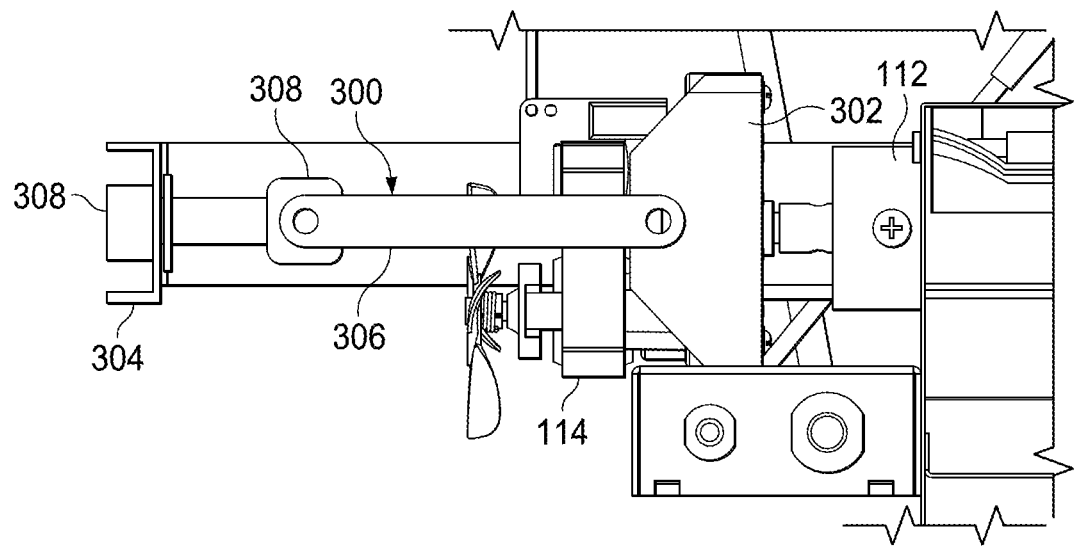
FIG. 3D is a side view of the device of FIG. 3A.

Referring now to FIG. 3A, a perspective cutaway view of another jam clearing device 300 according to aspects of the present disclosure is shown. FIG. 3B is an overhead view of the device of FIG. 3A; FIG. 3C is a perspective view of the device of FIG. 3A; and FIG. 3D is a side view of the device of FIG. 3A. The device 300 imparts longitudinal movement to the auger 404 and drive mechanism 114 for clearing jams but does not necessarily rely on any handle. A threaded stud 310 attaches to a U-shaped bracket 304 that attaches to the appliance frame or a portion of the cabinet 106 (or other fixed location) on one or both sides of the auger inlet area (e.g., hopper 102). A cross member 308 connects to one more arms 306 that affix to the drive mechanism 114 by bracket 302. When the threaded stud 310 is turned with a wrench or hand tool, the drive mechanism 114 and/or auger 404 pushed in or pulled out along the axial length of the auger tube 112 thus breaking up and clearing the pellet jam. The threaded stud 310 may be located behind a removable access panel, may be accessible through a small hole, or may project through the outer wall of the housing around the assembly (e.g., cabinet 106).

Figure 4A:
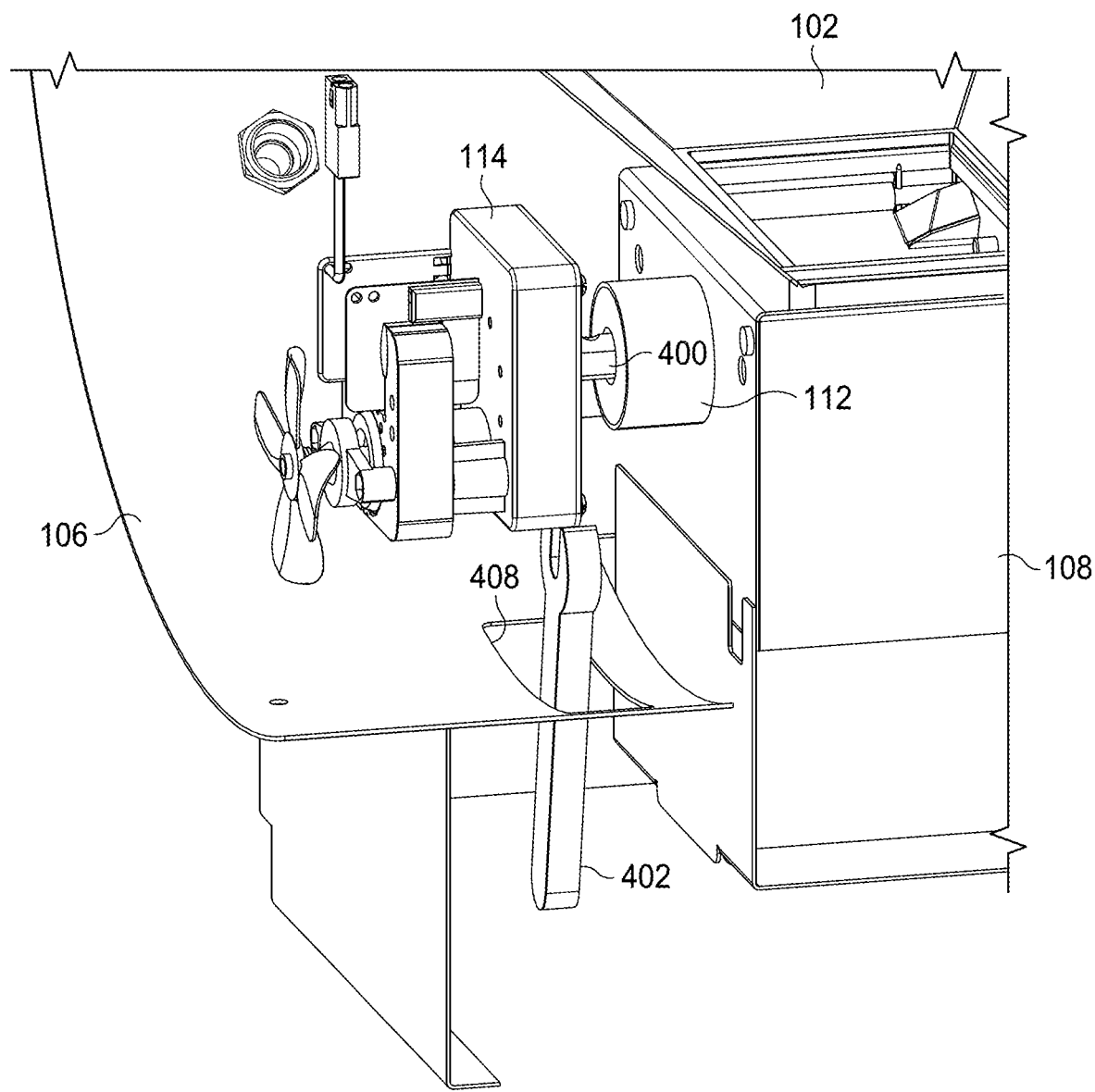
FIG. 4A is a cutaway view of a jam clearing system according to aspects of the present disclosure.
Figure 4B:
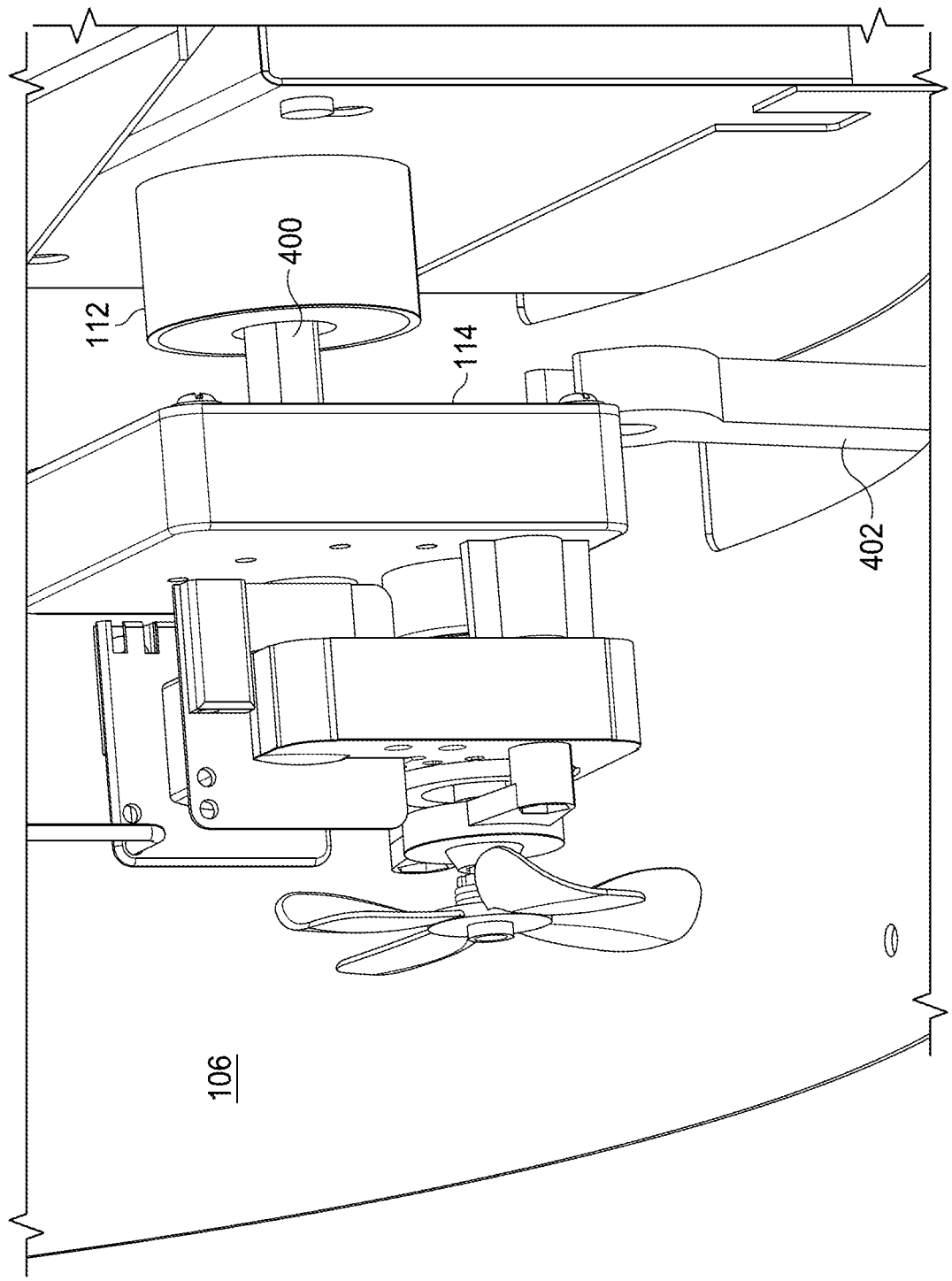
FIG. 4B is a closeup cutaway view of the device of FIG. 4A.
Figure 4C:
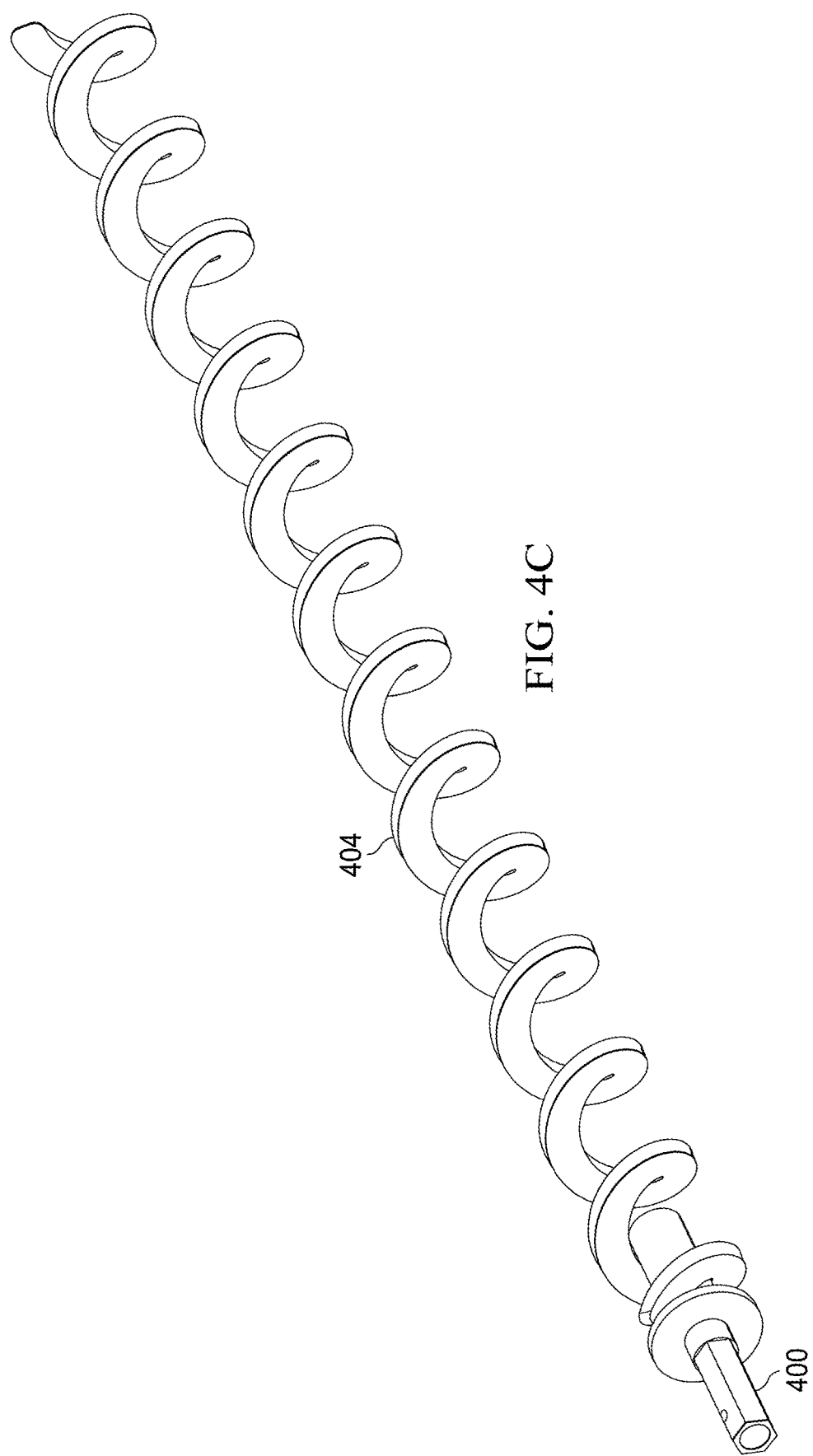
FIG. 4C is a perspective view of an auger for use with the system of FIG. 4A.
Figure 4D:
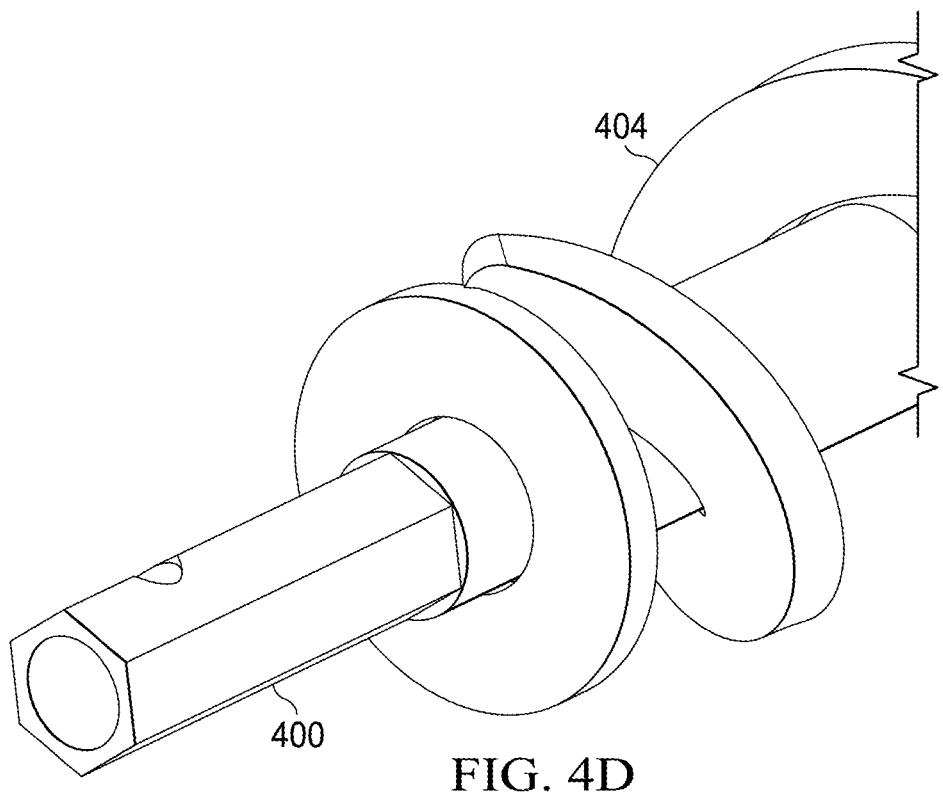
FIG. 4D is a closeup perspective view of a connecting end of the auger of FIG. 4C.

Referring now to FIG. 4A a cutaway view of a jam clearing system according to aspects of the present disclosure is shown. FIG. 4B is a closeup cutaway view of the device of FIG. 4A. The illustrated embodiment provides a hexagonal shaft 400 on the output of drive mechanism 114. The drive mechanism 114 is spaced apart from the auger tube 112 sufficiently so that a wrenching device 402 may be inserted into a slot 408 defined in the cabinet 106 to engage with the shaft 400. Manipulation of the wrenching tool 402 provides for manual rotation of the auger for clearing jams. The mechanical advantage of the wrenching tool 402 can exceed output torque from the drive mechanism 114 and successfully clear a jam. In some embodiments, the wrenching tool 402 may be a commonly available open-ended wrench or a crescent wrench. For further illustration, FIGS. 4C and 4D illustrate the relationship between shaft 400, which is rigidly fixed to auger 404 (inside auger tube 112, when assembled) such that rotation of the shaft 400 results in rotation of the auger 404.

Figure 5A:
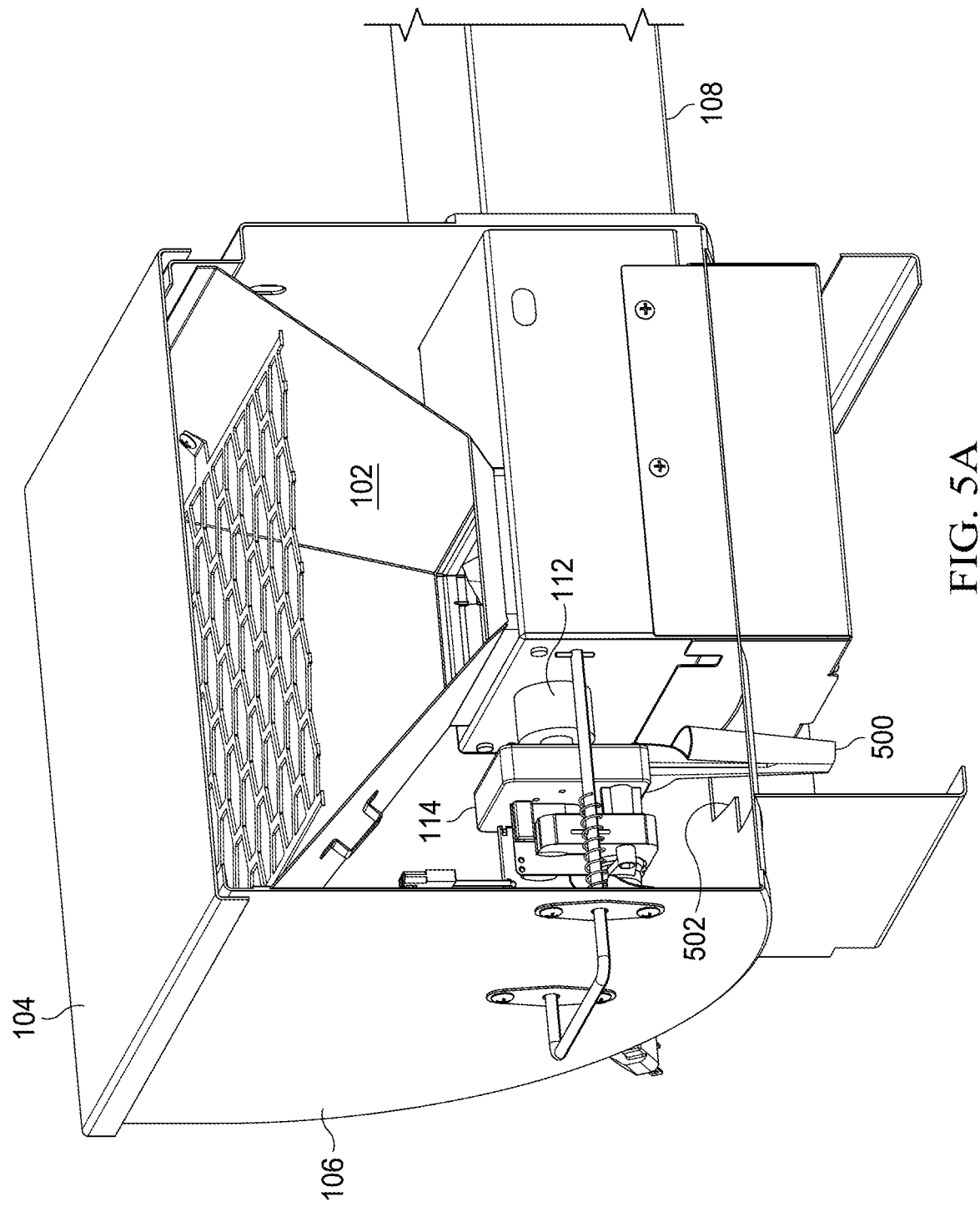
FIG. 5A is a perspective cutaway view of another jam clearing system according to aspects of the present disclosure.
Figure 5B:
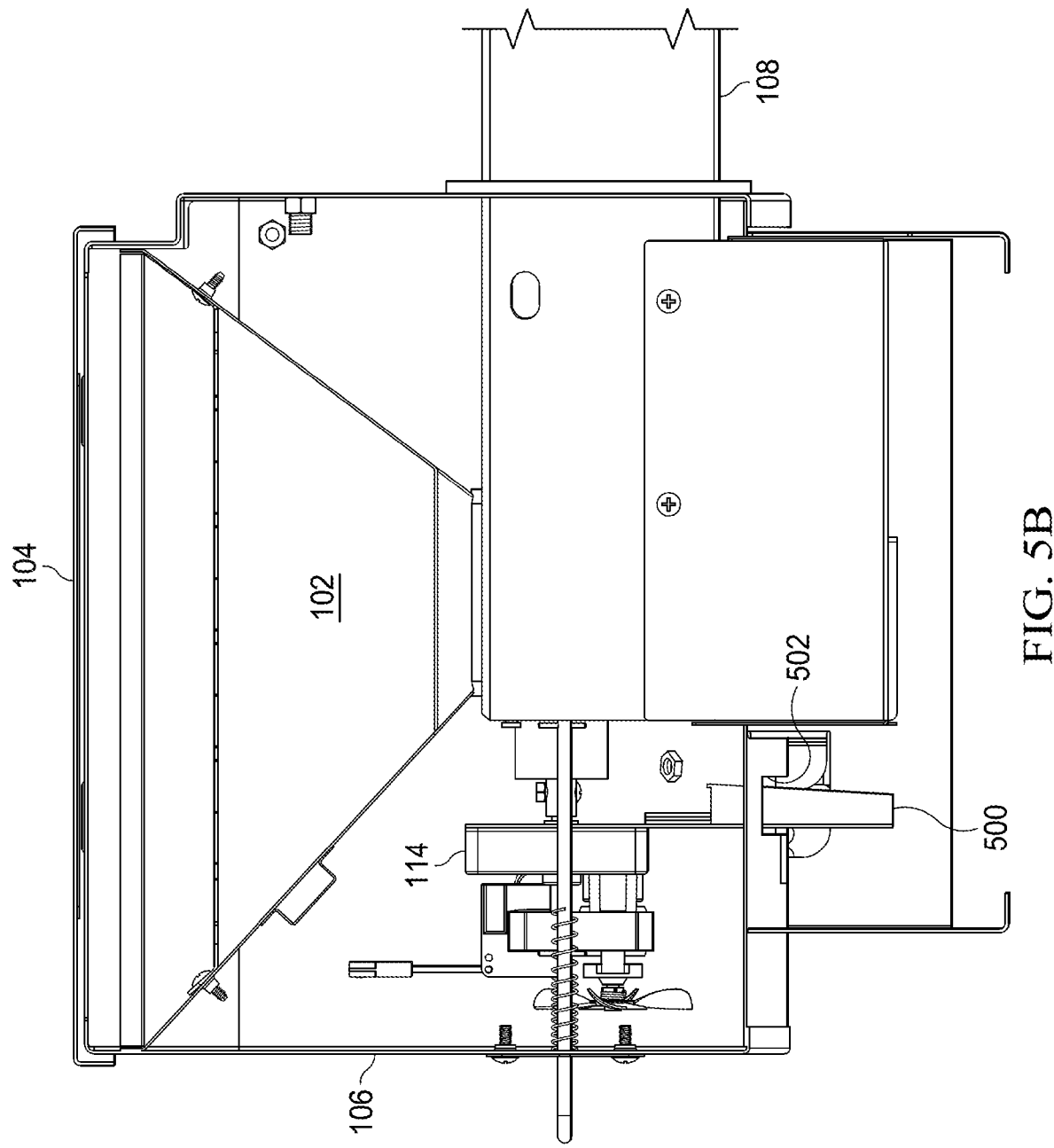
FIG. 5B is a side cutaway view of the system of FIG. 5A.

Referring now to FIG. 5A a perspective cutaway view of another jam clearing system according to aspects of the present disclosure. FIG. 5B is a side cutaway view of the system of FIG. 5A; and FIG. 5C is another perspective cutaway view of the jam clearing system of FIG. 5A. This embodiment uses a lever handle 500 connected to the motor drive gear box (e.g., drive mechanism 114) projected through a slot 502 defined the sheet metal surrounding the auger drive mechanism (e.g., cabinet 106). When the motor is energized the gearbox rotates in reaction to the auger torque until the lever 500 contacts and end of the slot 502 where it stays in normal operation. In the event of an auger jam the lever 500 can be manipulated by moving from that end of the slot 502 to the other end of the slot repeatedly thus imparting alternating rotational action to the auger.

The embodiments of the present disclosure provide consumers with the feature and benefit of the ability to remove or clear a pellet jam easily with minimal removal of components or disassembly of the pellet smoker. It will be noted and one of the distinguishing characteristics of all the systems described herein that rather than relying on complex and finely tuned systems of electronic sensors and controls as described in the application noted above, the disclosed embodiments uses the extremely sensitive and freely available human ability to sense forces and torques, draw appropriate conclusions from the evidence of the senses and apply intelligent and experience based measures to effect the desired results.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
    a drive mechanism affixed to an auger to selectively impart rotational forces to the auger for movement of pellet fuel for a cooking grill; and
    a lever arm affixed in a pivoting relationship to the drive mechanism and to a fixed location separate from the drive mechanism such that manipulation of the lever arm results in longitudinal movement of the auger;
    wherein:
        the lever arm further comprises a lower transverse segment extending to a handle and a middle segment extending upward to an upper segment;
        the upper segment is rotationally connected to the drive mechanism on an upper portion thereof; and
        the upper segment is rotationally connected to a bracket on an air plenum as the fixed location separate from the drive mechanism.

2. The system of claim 1, further comprising a handle affixed to the lever arm above a level of the auger.

3. The system of claim 1, wherein the lever arm further comprises an upper transverse segment affixed to a handle on a first end and to a substantially upright segment on a second end, the substantially upright segment affixed to the drive mechanism on an upper portion thereof and affixed to the fixed location on a lower portion thereof.

4. The system of claim 3, further comprising a bracket interposing the drive mechanism and the substantially upright segment and having a pivot axle fitted into an oblong opening in the substantially upright segment.

5. The system of claim 4, further comprising a bracket affixed to an air intake plenum as the fixed location separate from the drive mechanism and connected to the lower portion of the substantially upright segment.

6. The system of claim 5, further comprising a boss extending from the lower portion of the substantially upright segment to limit rotation of the lever arm with respect to the bracket affixed to the air intake plenum by contacting the air intake plenum.

7. The system of claim 1, further comprising a handle affixed to the lever arm below a level of the auger.

8. The system of claim 1, further comprising a bracket interposing the drive mechanism and the upper portion of the upper segment and connecting to the upper segment by an axle fitted into an oblong opening in the upper segment.

9. The system of claim 8, further comprising a boss extending from the middle segment to limit rotation of the lever arm with respect to the fixed location by contacting the air plenum.

10. The system of claim 1, further comprising an auger tube in which the auger rotates and through which the pellet fuel travels, the auger tube having a fixed relationship with respect to the fixed location separate from the drive mechanism such that longitudinal movement of the auger results in longitudinal movement of the auger within the auger tube.

11. The system of claim 10, wherein the fixed location separate from the drive mechanism comprises an air plenum through which the auger tube and auger travel to a fire pot provided combustion air from the plenum.

12. A system comprising:
    a drive mechanism affixed to an auger to selectively impart rotational forces to the auger for movement of pellet fuel for a cooking grill;

a lever arm affixed in a pivoting relationship to the drive mechanism and to a fixed location separate from the drive mechanism such that manipulation of the lever arm results in longitudinal movement of the auger; and an auger tube in which the auger rotates and through which the pellet fuel travels, the auger tube having a fixed relationship with respect to the fixed location separate from the drive mechanism such that longitudinal movement of the auger results in longitudinal movement of the auger within the auger tube;

wherein the fixed location separate from the drive mechanism comprises an air plenum through which the auger tube and auger travel to a fire pot provided combustion air from the plenum.

* * * * *